(12) United States Patent
deLassus

(10) Patent No.: US 6,923,395 B2
(45) Date of Patent: Aug. 2, 2005

(54) TAPE DRIVE LEADER CONNECTION SENSING ASSEMBLY

(75) Inventor: John F. deLassus, Louisville, CO (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 10/678,781

(22) Filed: Oct. 3, 2003

(65) Prior Publication Data

US 2004/0061012 A1 Apr. 1, 2004

Related U.S. Application Data

(62) Division of application No. 10/214,273, filed on Aug. 6, 2002, now Pat. No. 6,685,122.

(51) Int. Cl.$^7$ ............................................. G11B 15/66
(52) U.S. Cl. ............................ 242/332.4; 242/332.1; 360/95
(58) Field of Search ........................ 242/332.4, 332.1; 360/95

(56) References Cited

U.S. PATENT DOCUMENTS 6,614,611 B1 * 9/2003 Zweighaft .................... 360/69
6,685,122 B1 * 2/2004 deLassus ................. 242/332.4

* cited by examiner

Primary Examiner—John Q. Nguyen
(74) Attorney, Agent, or Firm—Patton Boggs LLP

(57) ABSTRACT

A sensing assembly for use in determining if magnetic tape within a single reel tape cartridge properly disconnects from a takeup reel within a tape drive during unloading of the tape cartridge, so that the tape cartridge can be removed from the tape drive without damaging the tape media and rendering the tape drive inoperable. The sensing assembly may be electrical or electomechanical and comprises at least one sensing apparatus for providing feedback on the position of the takeup leader. The position of the takeup leader is used to determine if the tape cartridge leader disconnects from the takeup leader. The sensing assembly may be utilized within a tape drive or with a test fixture for testing a plurality of disconnect operations.

10 Claims, 10 Drawing Sheets

TAPE DRIVE LEADER CONNECTION SENSING ASSEMBLY

CROSS-REFERENCE TO RELATED APPLICATIONS

This application claims priority from, and is a divisional of, U.S. patent application Ser. No. 10/214,273, filed on Aug. 6, 2002, now U.S. Pat. No. 6,685,122, entitled "Tape Drive Leader Connection Sensing Assembly."

FIELD OF THE INVENTION

The invention relates to digital tape drive storage devices, and in particular, to a sensing assembly for determining the connection status between magnetic tape within the tape cartridge and a takeup reel within a digital tape drive.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within the tape cartridge and a takeup reel located within the tape drive. After the tape cartridge is inserted into the tape drive, the magnetic tape must be connected to the takeup reel. Various methods have been employed to make this connection. One such method connects the magnetic tape to the takeup reel via a buckle between a tape cartridge leader and a takeup leader as described in U.S. Pat. No. 4,572,460.

The magnetic tape within the tape cartridge is terminated at one end by the tape cartridge leader, which is a strong flexible plastic strip containing an ovular aperture on its distal end. The takeup leader is a similar strong flexible plastic strip attached at one end to the takeup reel. The other end has a stem and tab designed to buckle with the ovular aperture on the tape cartridge leader. When the tape cartridge is inserted into the tape drive, the takeup leader and tape cartridge leader are positioned to buckle together. This system improved on prior art systems employing a combination of vacuum and air pressure to guide the tape through a path, but still results in connection failures due to wear, misalignment or other causes.

When the tape cartridge is ejected, first the two leaders should become separated or disconnected to allow the tape cartridge to be removed from the tape drive. When the tape cartridge is ejected while the two leaders are still connected, damage can occur to both leaders, rendering the tape drive inoperable and the tape cartridge damaged. In the prior art, disconnect failures were not always detected by the tape drive. Due to the nature of the tape media, once the tape media within the tape drive is damaged, the data previously recorded on the tape media is not recoverable. In addition, because the disconnection mechanism wears out over time, the problem of disconnection failures is most common in high duty cycle applications, where it causes the most damage. For example, in applications such as library tape drive systems, a broken tape results in an eject failure. The library is then inoperable since one of the tape cartridge leaders failed to disconnect from the takeup leader.

A sensing assembly for use in determining if magnetic tape within the single reel tape cartridge properly connects to the take up reel within the tape drive during loading of the tape cartridge is disclosed by Zweighaft (U.S. Pat. No. 6,186,430). The sensing apparatus disclosed in '430, in conjunction with a processor detects various movements in the tape drive consistent with specific connection statuses, namely, proper connection and connection failure. Detecting movement first of the freely rotating supply reel and then the takeup reel as the supply reel is slightly energizes provides confirmation that the connection exists.

While the apparatus in '430 detects connection status when the tape cartridge is inserted into the tape drive, the apparatus does not detect a failure during disconnection of the takeup leader from the tape cartridge leader when a tape cartridge is ejected from the tape drive. Failure of the takeup leader and the tape cartridge leader to disconnect when the tape cartridge is ejected from the tape drive results in damage to the takeup leader and the tape media within the tape cartridge. Once the tape media within the tape cartridge is damaged, the data previously stored on the tape media can not be recovered.

For these reasons, it is desirable to have a sensing mechanism that detects a failure of the takeup leader to disconnect from a tape cartridge leader and alerts an operator of the disconnection failure.

SOLUTION

The present tape drive sensing assembly overcomes the problems outlined above and advances the art by providing an apparatus and method for testing the disconnection status of the tape cartridge leader from the takeup leader prior to removal of the tape cartridge from the tape drive. A sensing assembly provides a means for notifying an operator when the takeup leader and tape cartridge leader fail to properly disconnect.

The sensing assembly detects the position of the takeup leader following a disconnection operation to determine the successfulness of the unbuckle operation. If the disconnection operation fails to disconnect the tape cartridge leader from the takeup leader, the sensing assembly generates a signal that can be used to inform the operator of the disconnection failure.

In an alternate embodiment the present tape drive sensing assembly provides an apparatus and method for testing repeated disconnection operations in a laboratory environment. The present sensing assembly can be used to test a tape drive of a variety that does not include a sensing mechanism built into the tape drive. It may be used as part of a test apparatus to sense when a disconnect failure occurs in the course of continual insertion/ejection cycling for improving the reliability of the tape drive. Testing the single reel tape drive utilizing the sensing assembly may be used to reduce the number of disconnection failures in the tape drives in the field.

DETAILED DESCRIPTION

The misbuckle detector summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
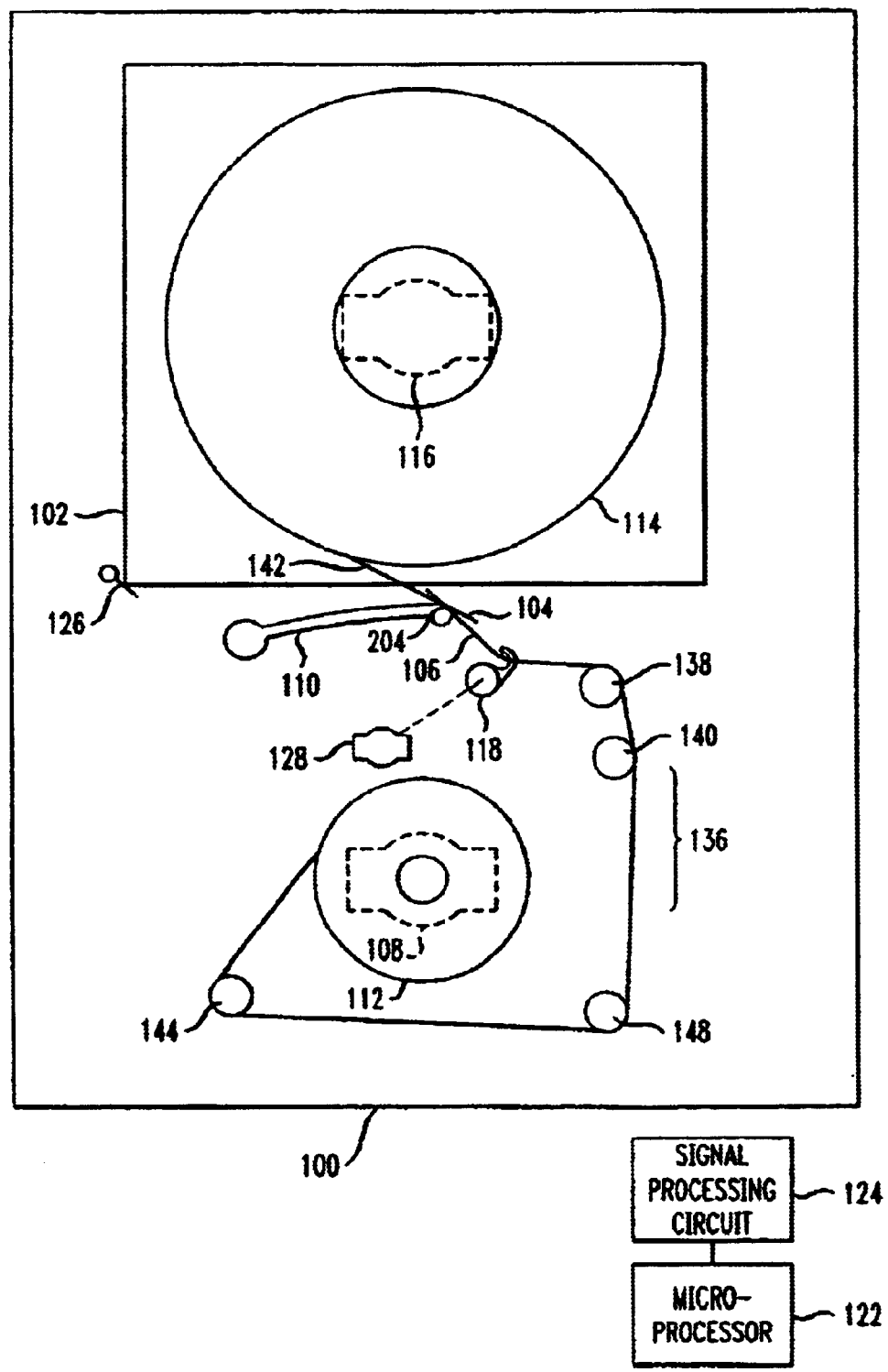
FIG. 1, illustrates a tape drive embodying the sensing assembly of the present tape drive leader connection sensing assembly.

FIG. 1 illustrates tape drive 100 embodying the sensing assembly of the present invention. By way of background, the tape loading operation begins when tape cartridge 102 is inserted into tape drive 100. Tape cartridge 102 houses a length of magnetic tape 142 wound around supply reel 114. Magnetic tape 142 includes a tape cartridge leader 104 connected to its free end. Takeup reel 112 includes a similar takeup leader 106. Takeup leader 106 connects to the takeup reel 112 and winds around guide rollers 144, 148, 140, and 138 where it hooks on catch 118.

When tape cartridge 102 is fully inserted into tape drive 100, tape cartridge leader 104 is positioned to connect with takeup leader 106. Positioning lever 110 positions tape cartridge leader 104 and takeup leader 106 for connection and disconnection. The loading of tape cartridge 102 engages cartridge present switch 126. Microprocessor 122 in response to a signal from cartridge present switch 126 initiates the connection of takeup leader 106 and tape cartridge leader 104. The connection between takeup leader 106 and tape cartridge leader 104 is in the form of a buckle.

Figure 2:
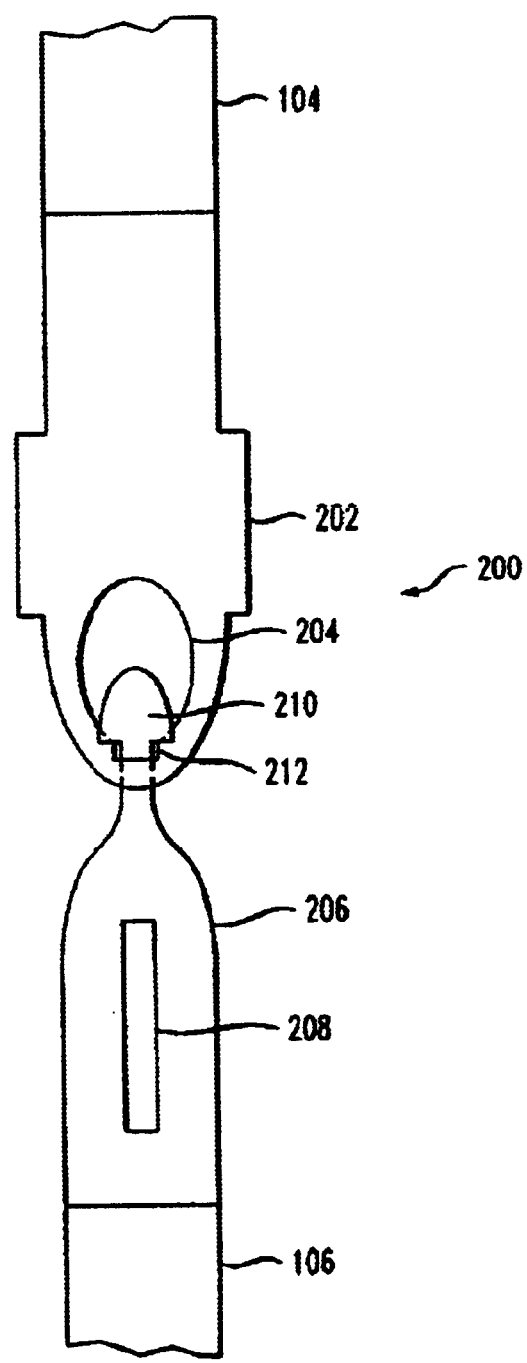
FIG. 2, illustrates a close up view of the connection between the tape cartridge leader and the takeup leader.

FIG. 2 illustrates a close up view of the buckle between tape cartridge leader 104 and takeup leader 106. Tape cartridge leader 104 comprises a first elongated flexible plastic strip 202 containing an ovular aperture 204 defined therein. Takeup leader 106 comprises a similar second elongated flexible plastic strip 206, which contains an integrally formed stem 212 and tab 210 that are proportioned to buckle with ovular aperture 204 as illustrated by FIG. 2. Takeup leader 106 also includes an elongated rectangular slot 208 that is proportioned to hook onto catch 118 of FIG. 1.

Referring back to FIG. 1, in the buckled position, the takeup leader and connected tape cartridge leader are within the tape path aligned with catch 118 and the positioning lever 110. Microprocessor 122 responsive to a signal to eject the tape cartridge rotates catch 118 from loaded position clockwise to the unloaded position thereby catching takeup leader 106 while positioning lever 110 holds takeup leader 106 so that stem 212 is extracted through aperture 204. The leaders are now positioned such that the tape cartridge 102 may be pulled straight out of the tape drive. The tape drive has an eject mechanism that pushes the tape cartridge partially out of the tape drive. This completes the disconnection between the tape cartridge leader 104 and takeup leader 106. If tape cartridge leader 104 and takeup leader 106 do not unbuckle properly due to wear, misalignment or other causes, takeup leader 106 may be pulled past catch 118 and eventually stretch the tape media as the tape cartridge is removed from the tape drive, thereby damaging the tape media. Tape path 136 comprises the path of magnetic tape 142 from its origination on supply reel 114 to its destination on takeup reel 112, including supply motor 116, takeup motor 108, and load motor 128. Tape path 136 also includes positioning lever 110, catch 118, a plurality of guide rollers e.g. 148, 138, 140, and 144, and takeup reel 112.

In the event that a bad disconnection causes the tape cartridge leader to pull the takeup leader 106 as the tape cartridge is removed from the tape drive, the tape media within the tape cartridge may be damaged. The length of tape media within the tape cartridge is drawn taunt as the tape cartridge is moved further from the takeup reel, stretching the tape media and rendering the tape drive and the tape cartridge inoperable. To operate again, the tape drive 100 must be disassembled so that the takeup leader and the tape cartridge leader may be disconnected and the takeup leader 106 can be reconnected to catch 118. The section of the length of tape media within the tape cartridge is damaged and the data recorded thereon may be permanently destroyed.

Figure 3:
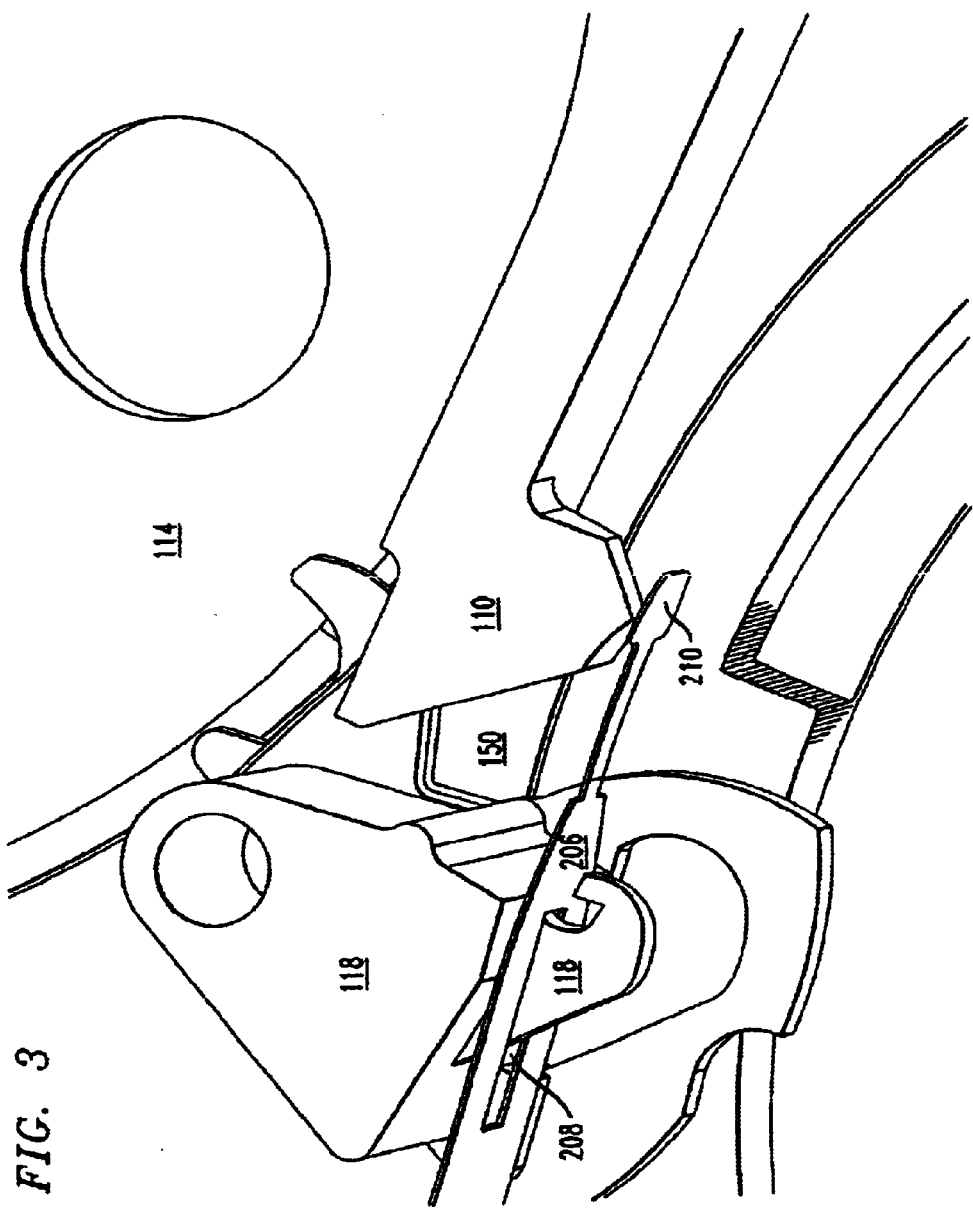
FIG. 3 is a close up perspective view of the takeup leader in a disconnected position.
Figure 4:
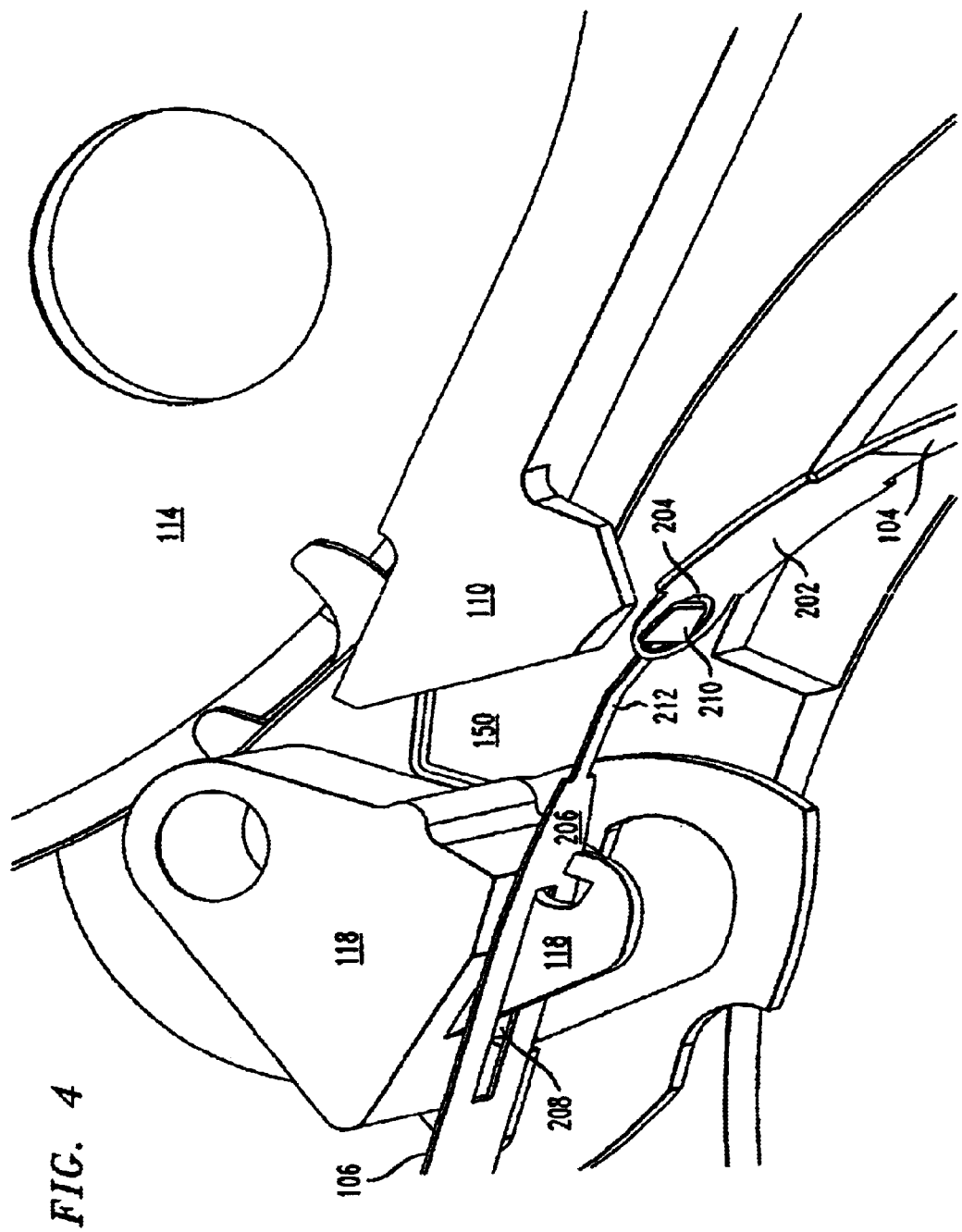
FIG. 4 is a close up perspective view illustrating failure of the tape cartridge leader and the takeup leader to disconnect.
Figure 5:
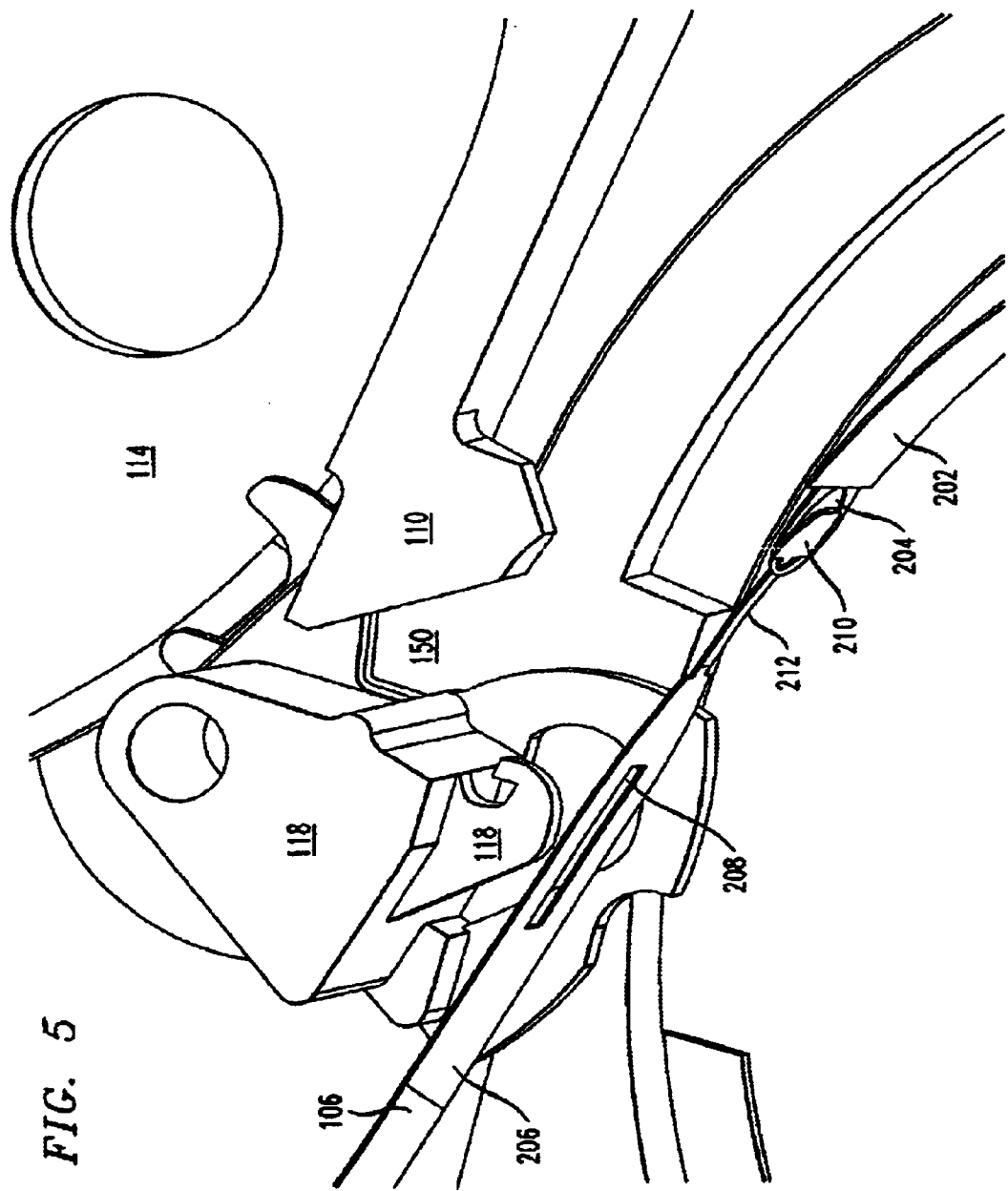
FIG. 5 is another close up perspective view illustrating failure of the tape cartridge leader and the takeup leader to disconnect.

Leader Connection Status:

Under normal operating conditions, when the takeup leader is disconnected from the tape cartridge leader, catch 118 is hooked through slot 208 and tab 210 of the takeup leader rests against positioning lever 110 as illustrated in the close up perspective view of FIG. 3. Microprocessor 122 in response to a signal to eject the tape cartridge 102 initiates the disconnection operation to disconnect the takeup leader 106 from the tape cartridge leader 104. When the disconnection fails as illustrated in FIG. 4, the takeup leader 106 remains connected to the tape cartridge leader 104 as the tape cartridge is ejected from the tape drive. The takeup leader may remain hooked to catch 118 as illustrated in FIG. 4 or may be unhooked as illustrated in FIG. 5. In both failed configurations, the takeup leader fails to return to its disconnected position in contact with positioning lever 110.

Therefore, determining the position of the takeup leader following a disconnection operation is indicative of the disconnection status. Once a disconnection fails, the tape cartridge should not be removed from the tape drive. Removal of the tape cartridge from the tape drive will damage the tape media within the tape cartridge destroying the data previously stored on the tape media. Failure of the tape drive to notify the operator of the failed disconnection results in the operator removing the tape cartridge from the tape drive and thereby damaging the tape media. The sensing assembly may be electrical or electromechanical.

Alternatively, the sensing assembly may be an electromechanical apparatus for detecting the position of the takeup leader following a disconnection operation. In this alternative embodiment, the electromechanical apparatus may be used to detect the position of the takeup leader following an unbuckle operation. Referring to the electromechanical apparatus of FIG. 6, the primary components are a rotatable barrel 310 and an elongated member 318 extending through the barrel 310 and protruding downwardly behind the tape path and between the catch 118 and the positioning lever 110 and extending upwardly in the path of a sensing mechanism. The sensing mechanism provides a method for detecting a rotational movement of the barrel 310 and coupled elongated member 318. The sensing mechanism 322 detects a change in the rotational position of the elongated rod member 318 and provides feedback to the microprocessor in response to the rotation wherein the rotation reflects the position of the takeup leader within the tape path. Thus, the rotational movement is used to determine the position of the takeup leader and therefore if the buckle is disconnected. For the purpose of illustration, the sensing mechanism 322 is described utilizing a light emitting source 314 and a corresponding light detecting device 316 although other sensing mechanisms may be substituted. Those skilled in the art will appreciate numerous variations in the sensing configuration and operation that are within the scope of the present sensing assembly. Those skilled in the art will also appreciate how the principles illustrated in the two embodiments described below can be used in other embodiments of the sensing assembly as well as in other tape drive models that employ various leader disconnection methods and apparatus.

Figure 6:
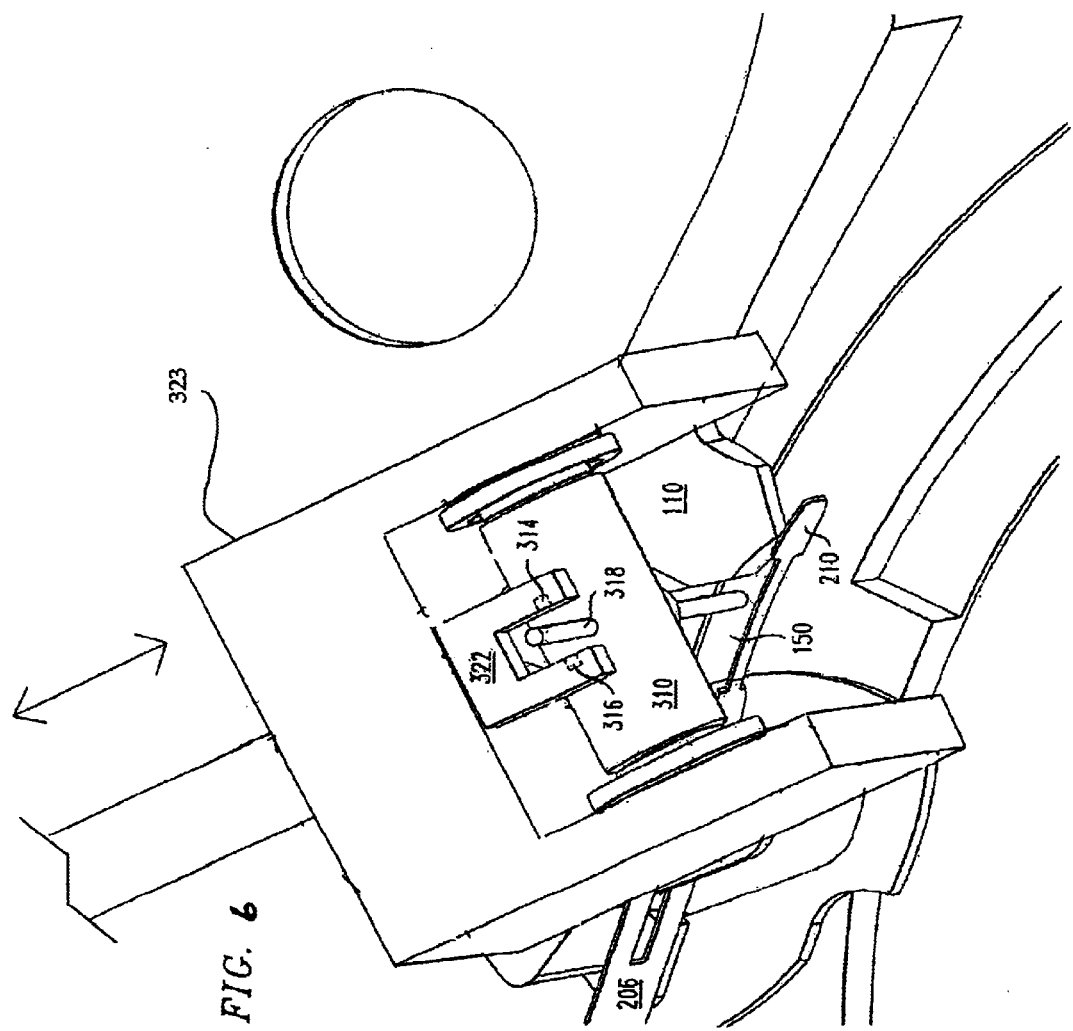
FIG. 6 is a close up perspective top view of a portion of another embodiment utilizing the present tape drive leader connection sensing assembly in position for testing a disconnection.

Still referring to FIG. 6, U-shaped member 322 attaches to a retractable arm 323 and partially surrounds the upwardly extending portion of the elongated rod 318 and houses light emitting source 314 and light detector 316 on opposing sides of U-shaped member 322. The light emitting source 314 and light detector 316 are positioned such that when the elongated rod 318 is stationary, the elongated rod 318 blocks the light emitted by light emitting source 314. The initial position of the elongated rod 318 is in an area 150 between catch 118 and positioning lever 110, away from the tape path. The retractable arm 323 moves the barrel 310 from the initial position toward the tape path traveling out of area 150.

As previously discussed, when the buckle between takeup leader 106 and the tape cartridge leader 104 disconnects, takeup leader 116 returns to a disconnected position in contact with positioning lever 110, thus enclosing the area 150 between catch 118 and positioning lever 110 as illustrated in FIG. 3. Referring back to FIGS. 4 and 5, when the disconnection fails, takeup leader 106 remains buckled to tape cartridge leader 104, drawing takeup leader 106 away from the positioning lever 110 as the tape cartridge 102 is ejected from the tape drive 100. Thus, determining the position of takeup leader 106 following a disconnection operation provides a method for determining the connection status between takeup leader 106 and tape cartridge leader 104.

Figure 7:
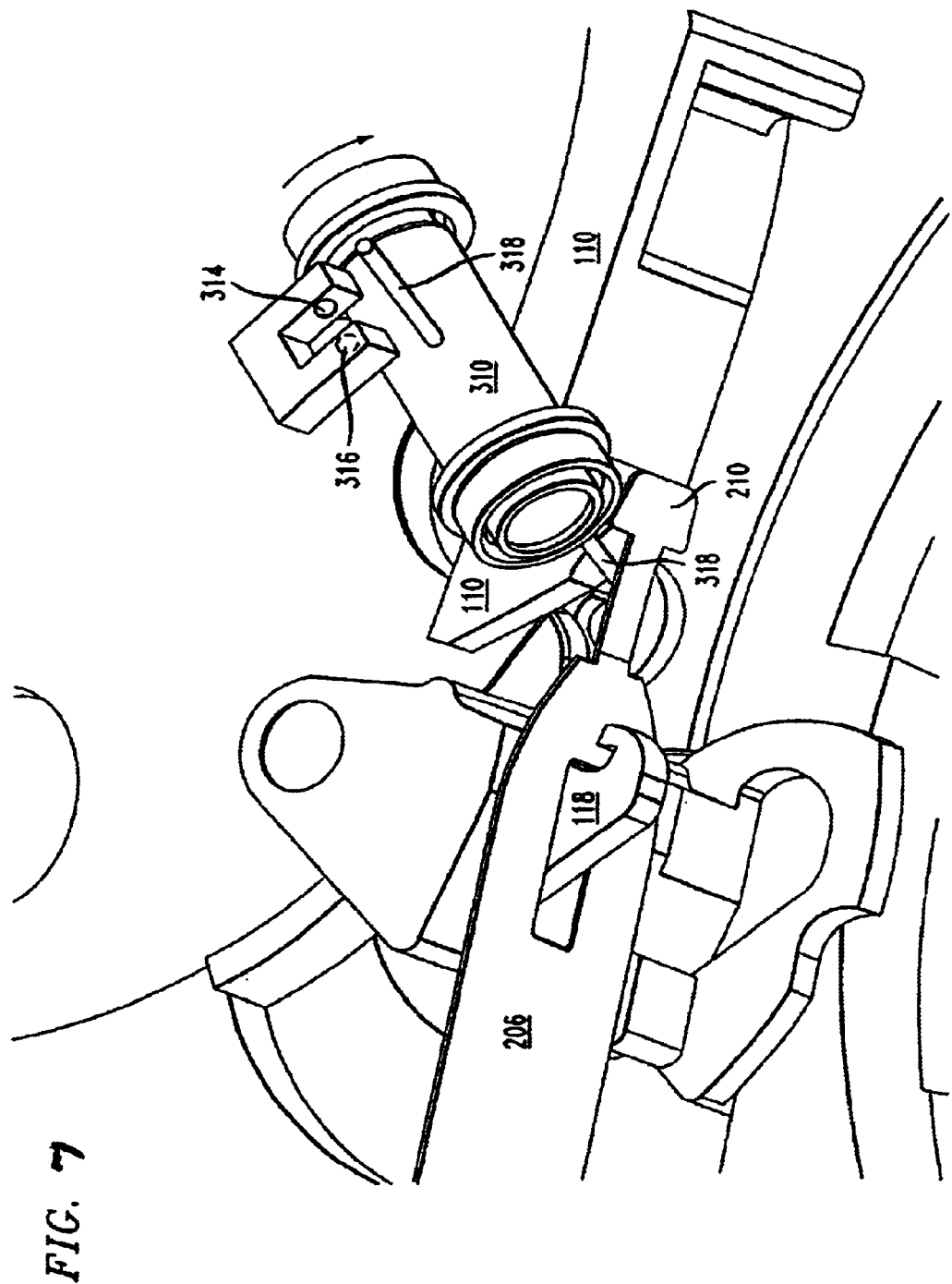
FIG. 7 is a close up perspective top view of a portion of the embodiment of FIG. 6 sensing assembly testing a proper disconnection.

The retractable arm 323 moves the barrel 310 towards the leader tip 210 following an unbuckle operation. If the takeup leader and the tape cartridge leader property disconnect, the takeup leader moves from area 150 to the disconnected position in contact with positioning lever 110 as illustrated in FIG. 7. In the case of a successful disconnect, FIGS. 6 and 7, as the elongated rod 318 pulls against takeup leader 206, barrel 310 is free to pivot. Rotation of the barrel 310 rotates elongated rod 318 out of the path between the light emitting source 314 and the light detector 318. In response to the rotation of the elongated rod 318, the light detector 316 provides feedback to the microprocessor. Detection of light by the light detector 316 indicates that the takeup leader and the tape cartridge leader properly disconnected.

Figure 8:
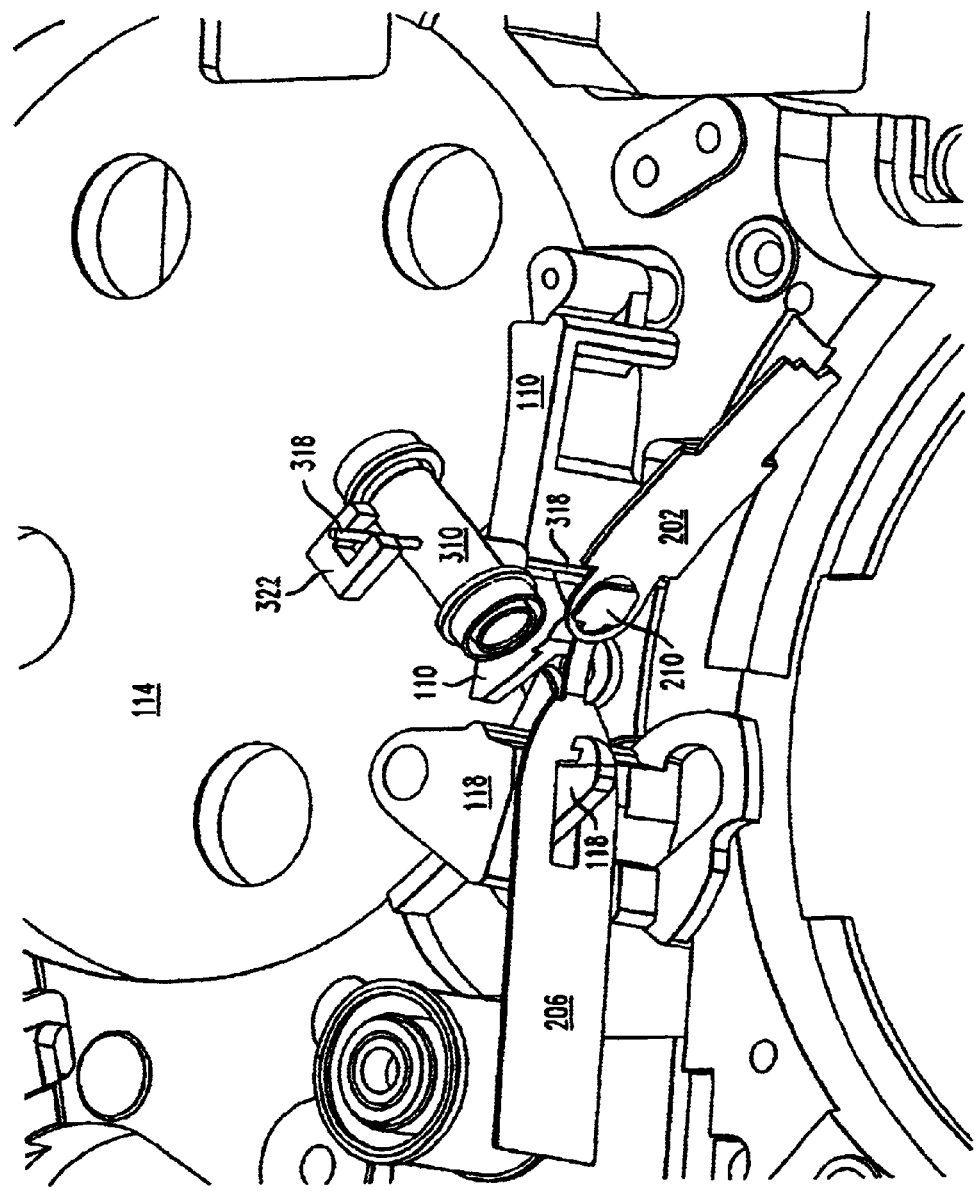
FIG. 8 is a close up perspective side view of a portion of the alternative embodiment of FIG. 6 testing a failed disconnection.
Figure 9:
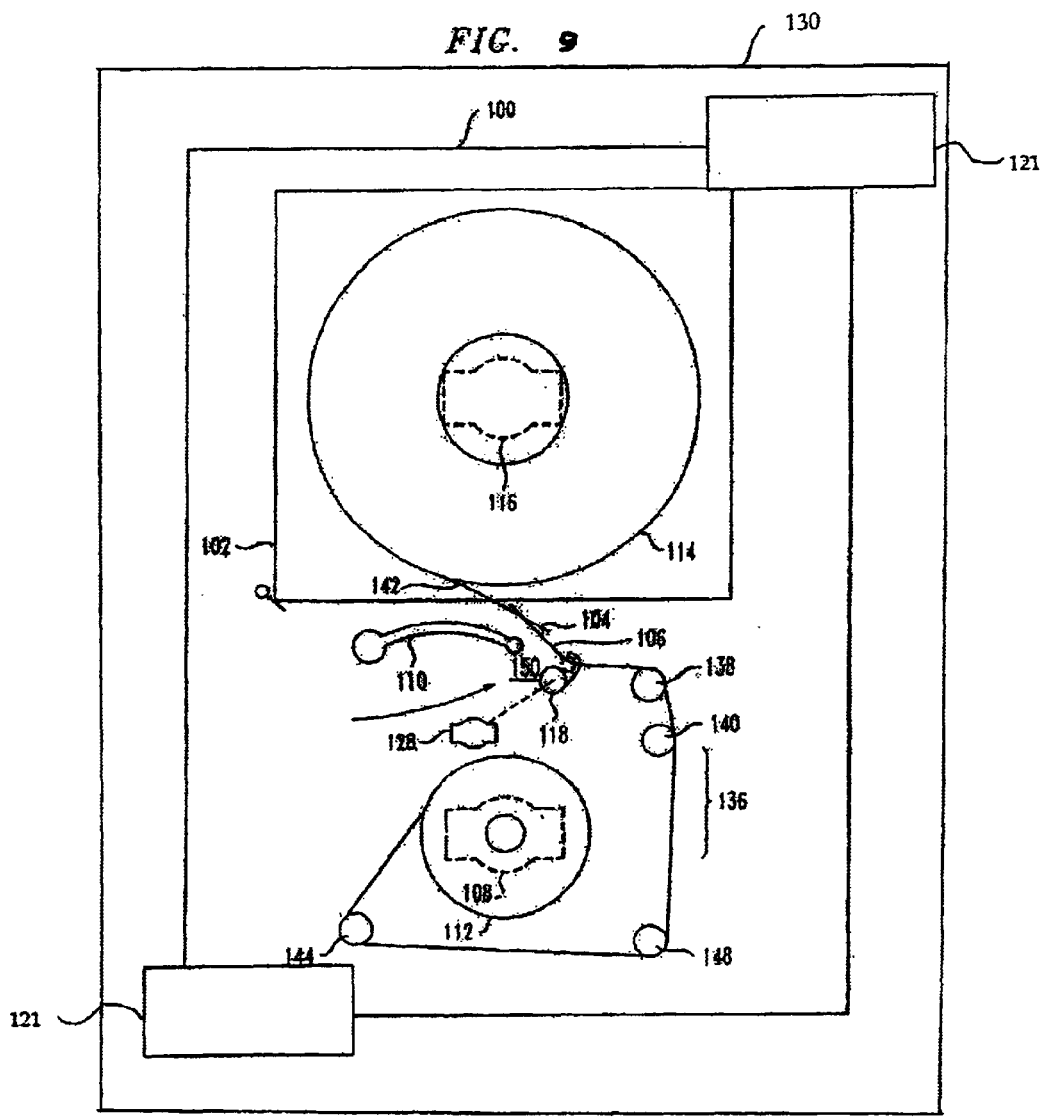
FIG. 9 is a top view of tape drive wherein the takeup leader failed to disconnect from the tape cartridge leader.

Referring to the failed disconnection condition of FIG. 8, when the retractable arm 323 moves barrel 310 forward towards takeup leader 206 following a failed disconnection, the barrel 310 does not rotate. Referring to FIG. 9, when the takeup leader 108 and the tape cartridge leader 104 fail to disconnect, the takeup leader remains in the tape path. When the retractable arm 323 moved the elongated rod 318 in the direction of the tape path, the elongated rod 318 does not encounter the takeup leader 106 and therefore travels outside of area 180 that is enclosed when the takeup leader is in its disconnected position. Barrel 310 and elongated rod 318 do not rotate when the elongated rod 318 is free to travel out of area 150 and toward the tape path.

Thus, the present tape drive leader connection sensing assembly provides a method for determining the position of the takeup leader and notifying the operator of the failed disconnection such as providing an audible sound or visual display to alert the operator of the failed disconnection and thereby prevent the operator from pulling the tape cartridge out of the tape drive and damaging the tape media therein. Use of the present tape drive connection sensing assembly for a tape drive installed in a tape cartridge library, or autoloader, apparatus provides a method for notifying the tape cartridge system and the operator that the takeup leader has failed to disconnect from the tape cartridge leader.

Tape Drive Leader Connection Test Apparatus:

The present tape drive connection sensing assembly also provides a method for testing the disconnection operation of the tape drive in a laboratory environment. The sensing assembly is connected by a connection means 121 to a test fixture 130 and positioned above a tape drive 100 for testing repeated unbuckle operations. In the testing configuration, a controller circuit may initiate an unbuckle operation of the tape drive. Following the unbuckle operation, the position of the takeup leader is detected by the test fixture 130 sensing assembly. In response to the position of the takeup leader, the sensing device may provide feedback to the controller indicating the position of the takeup leader. Recording the number of unbuckle operation attempts and the number of attempts that successfully disconnect the takeup leader from the tape cartridge leader provides a method for collecting reliability data.

Testing repeated tape drive unbuckle operations provides data that may be used to improve the operational characteristics of the tape drive, the takeup leader and the tape cartridge unbuckling operation. Improved performance of the tape drive unbuckle operation reduces the possibility of an operator damaging the tape media within the tape cartridge. Providing an alert for the operation when a failed unbuckle operation is detected allows the operator to discontinue use of the tape drive prior to damaging the tape media rendering the previously recorded data unrecoverable.

Electromechanical Sensing Assembly Operation:

The control circuit (not shown) extends/retracts a retractable arm 323 to initially position elongated rod 318 in area 150 between catch 118 and positioning lever 110 and behind tape path as previously described. FIGS. 6, 7 and 8 illustrate close up top views of a section of the electromechanical sensing assembly and tape drive 100. To provide a view of the elongated rod 318 extending into area 150 between the tape drive catch 118 and the positioning lever 110, housing 320 and retractable arm 323 are not shown.

Figure 10:
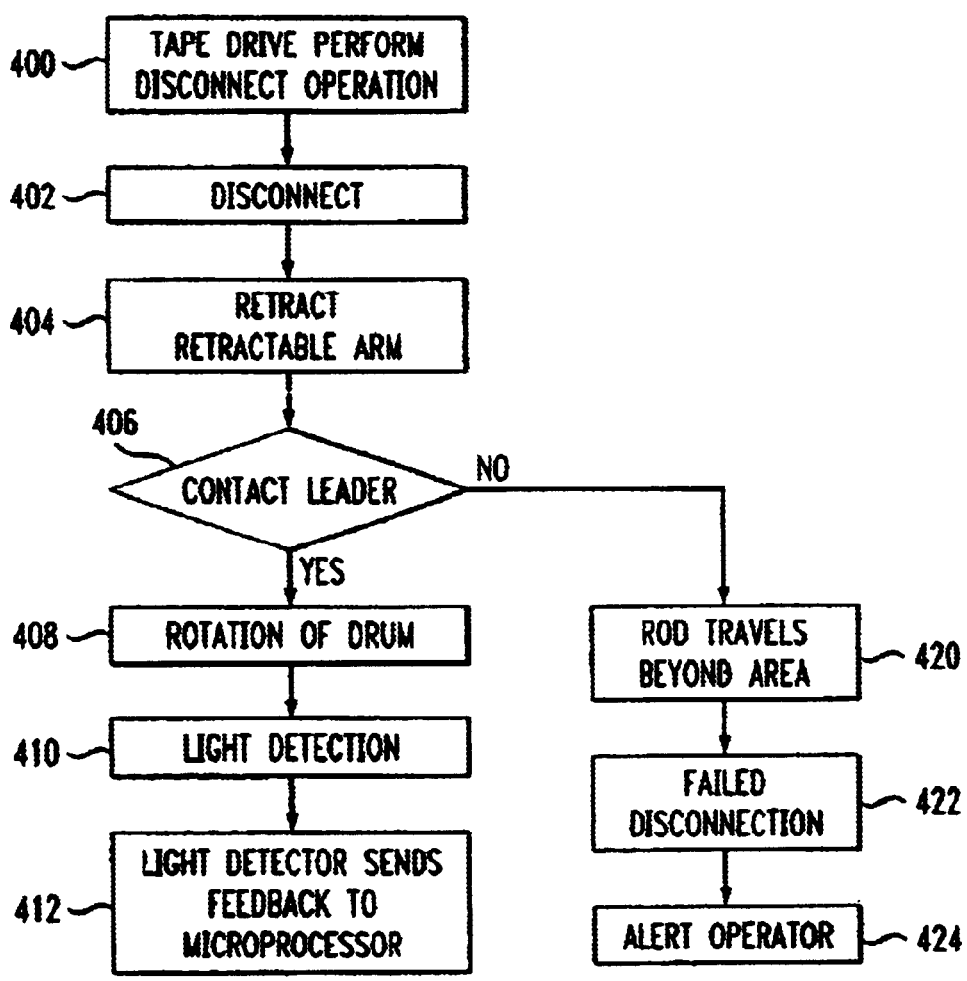
FIG. 10 is a flow diagram of the operating steps in the alternative embodiment of FIG. 6.

Referring to the operational flow diagram of FIG. 10 in conjunction with the perspective view of FIG. 6, following an unbuckle operation by the tape drive in step 400 the takeup leader and tape cartridge leader may property disconnect in step 402. The connection status of the takeup leader and tape cartridge leader is determined by the position of the takeup leader. To test the connection status, the test fixture 130 extends retractable arm 323 in step 404 moving elongated rod 318 in front of positioning lever 110 in the direction of the tape cartridge. If elongated rod 318 encounters takeup leader 106 resting in close proximity to positioning lever 110 in step 406, retention of elongated rod 318 in enclosed area 150 causes drum 310 and coupled elongated rod 318 to rotate in step 408. Rotational movement of elongated rod 318 in step 408 opens the light path between light emitting source 314 and light detector 316 in step 410. In response to detecting light, the light detector 116 send a signal to the microprocessor in step 412 indicating that the takeup leader 106 and the tape cartridge leader 104 properly disconnected in step 402.

If elongated rod 318 does not encounter takeup leader 106 in step 406 elongated rod 318 moves out of area 150 in step 420. The light path between light emitting source 114 and light detector 116 is not broken. Absence of a signal from the light detector 116 following the disconnect test, indicates that the takeup leader 106 and the tape cartridge leader 104 disconnection failed in step 402. In response to the failed disconnect, the microprocessor may provide an audible or visual signal to the operator in step 424 to alert the operator that the disconnection failed and that the tape cartridge should not be removed from the tape drive.

A preferred feature of both embodiments is to provide timely feedback on the disconnection status. As to alternative embodiments, those skilled in the art will appreciate that the present sensing assembly may be utilized to detect numerous variables within tape drive that indicate disconnection status. In addition, the present sensing assembly may be located on either side of the tape path and may be used to detect variables internally or externally to tape path that indicate connection status.

It is apparent that there has been described, a sensing assembly for determining if magnetic tape in a tape cartridge is properly connected to a tape drive, that fully satisfies the objects, aims, and advantages set forth above. While the sensing assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A sensing assembly for use with a tape drive employing a single reel equipped with a takeup leader for interconnecting with a tape cartridge leader connected to a length of tape media located within a tape cartridge, to determine it said tape cartridge leader disconnects from said takeup leader during unloading of said tape cartridge, so that said tape cartridge can be removed from said tape drive without damaging said length of tape media, comprising:
   means for disconnecting said takeup leader from said tape cartridge leader prior to removing said tape cartridge from said tape drive;
   at least one leader position detecting means to detect a position of at least one of said tape cartridge leader and said takeup leader following said disconnect, said position being used to determine if said tape cartridge leader disconnects from said takeup leader, comprising:
      a means for sensing movably located a distance from a tape path; and
      a means for moving said movable sensing means from an initial position into said tape path to detect said position of at least one of said takeup leader and said tape cartridge leader; and
   a processing means, responsive to said detected position of said at least one of said takeup leader and said tape cartridge leader, for determining if said tape cartridge leader disconnects from said takeup leader.

2. The sensing assembly of claim 1 wherein said sensing means is rotatable and comprises:
   a means for sensing a rotational position of said rotatable sensing means, said rotational position for determining if said tape cartridge leader disconnects from said takeup leader.

3. A test fixture for use in testing a tape drive employing a single reel equipped with a takeup leader for interconnecting with a tape cartridge leader connected to a length of tape media located within a tape cartridge, said takeup leader and said tape cartridge leader defining a tape path, to determine if said tape cartridge leader disconnects from said takeup leader during unloading of said tape cartridge, comprising:
   a connecting means for removably connecting said tape drive to said test fixture;
   means for disconnecting said takeup leader from said tape cartridge leader for removing said tape cartridge from said tape drive; and
   at least one leader position detecting means to detect a lateral position of at least one of said tape cartridge leader and said takeup leader relative to said tape path following said disconnect, said position being used to determine if said tape cartridge leader disconnects from said takeup leader, comprising:
      a means for sensing movably insertable into said tape drive;
      a means for moving said movable sensing means from an initial position into said tape path to detect said position of at least one of said takeup leader and said tape cartridge leader for determining if said tape cartridge leader disconnects from said takeup leader.

4. The sensing assembly of claim 3, wherein said sensing means is rotatable and comprises:
   a means for sensing a rotational position of said rotatable sensing means said rotational position for determining if said tape cartridge leader disconnects from said takeup leader.

5. The test fixture of claim 3, wherein said movable sensing means comprises:
   a rotatable member extending downward into said tape drive said distance from said tape path; and
   a means for sensing connected with said rotatable member for sensing a rotational position of said rotatable member.

6. The test fixture of claim 3 further comprising:
   a processing means, responsive to said detected position of said at least one of said takeup leader and said tape cartridge leader, for determining if said tape cartridge leader disconnects from said takeup leader.

7. A sensing assembly for use with a tape drive employing a single reel equipped with a takeup leader for interconnecting with a tape cartridge leader connected to a tape media located within a tape cartridge, to determine if said tape cartridge leader disconnects from said takeup leader during unloading of said tape cartridge from said tape drive, comprising:
   a disconnection apparatus for disconnecting said tape cartridge leader from said takeup leader prior to removing said tape cartridge from said tape drive;
   a sensing device for sensing a position of a one of said tape cartridge leader and said takeup leader following said disconnect, said sensing device comprising:
      a rotatable sensing means located a distance from a tape path;
      a means for moving said rotatable sensing means from an initial position into said tape path to detect said position of said takeup leader; and a means for sensing a rotational position of said rotatable sensing means, said rotational position for determining if said tape cartridge leader disconnects from said takeup leader; and a processor responsive to said sensed position of said take up leader for determining if said tape cartridge leader disconnects from said takeup leader.

8. A method for determining if a tape cartridge leader connected to a length of tape media within a tape cartridge disconnects from a takeup leader within a tape drive employing a single reel, said takeup leader and said tape cartridge leader defining a tape path, during unloading of said tape cartridge, comprising the step of:

(a) executing a disconnection operation to disconnect said tape cartridge leader from said takeup leader;

(b) sensing a lateral position of one of said tape cartridge leader and said takeup leader relative to said tape path following said disconnect operation, comprising:

positioning a movable sensing assembly a distance from a tape path;

moving said movable sensing assembly into said tape path; and sensing a position of said movable sensing assembly to determine if said tape cartridge leader successfully disconnected from said takeup leader; and (c) determining a connection status of said tape cartridge leader from said takeup leader.

9. The method of claim 8, wherein said connection determination step comprises the steps of:

determining a change in position of one of said tape cartridge leader and said takeup leader after said disconnection operation; and comparing said position change with a threshold to determine if said tape cartridge leader and said takeup leader are disconnected.

10. The method of claim 8, further comprising the step of:

alerting an operator of a disconnection failure in response to a determination that the disconnection failed.

* * * * *